Sept. 26, 1961     B. H. ZIMM     3,001,922
POLYMERS
Filed Dec. 19, 1955

Cumulative Molecular Weight Distribution Curve for Polystyrene with Continuous Light (Example 2)

Cumulative Molecular Weight Distribution Curve for Polystyrene with Discontinuous Light (Example 3)

Inventor:
Bruno H. Zimm,
by Paul A. Frank
His Attorney.

United States Patent Office 3,001,922
Patented Sept. 26, 1961

3,001,922
POLYMERS
Bruno H. Zimm, Schenectady, N.Y., assignor to General Electric Company, a corporation of New York
Filed Dec. 19, 1955, Ser. No. 553,917
5 Claims. (Cl. 204—162)

This invention relates to a process of preparing olefinic polymers having a narrow molecular weight range. More particularly, this invention relates to a process of controlling the molecular weight of olefinic polymers within a narrow range which comprises (1) initiating the polymerization of an emulsified olefinic monomer by a burst of free radicals, (2) allowing the polymerization to continue for a time which is substantially shorter than the natural lifetime of the growing radical chain (hereafter defined), (3) again exposing the system to another burst of free radicals, said burst terminating the first polymer chain and initiating a second polymer chain, and (4) repeating these bursts according to a fixed schedule as long as desired or until the monomer is totally polymerized. The polymer so produced having a narrow molecular weight range will also be referred to as a "monodisperse polymer."

This invention also relates to an improved water soluble free-radical photosensitizer useful in this invention comprising $\alpha,\alpha'$-azo-diisobutyramide; and the preparation thereof.

The features of this invention desired to be protected herein are pointed out with particularity in the appended claims. The invention itself may best be understood by reference to the following description taken in conjunction with the accompanying drawings.

Figure 1:
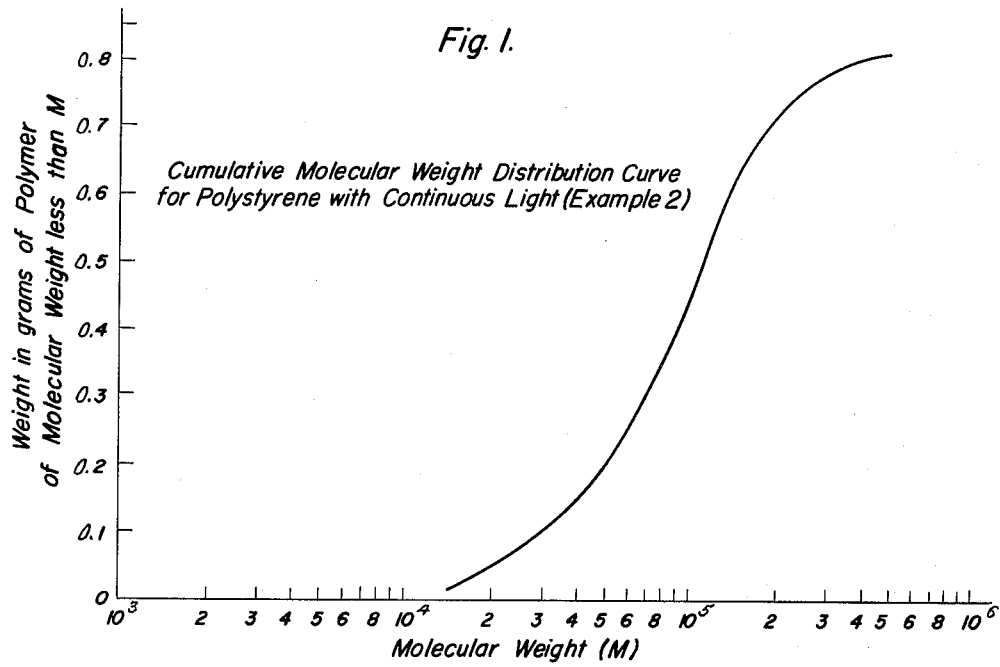
Figure 2:
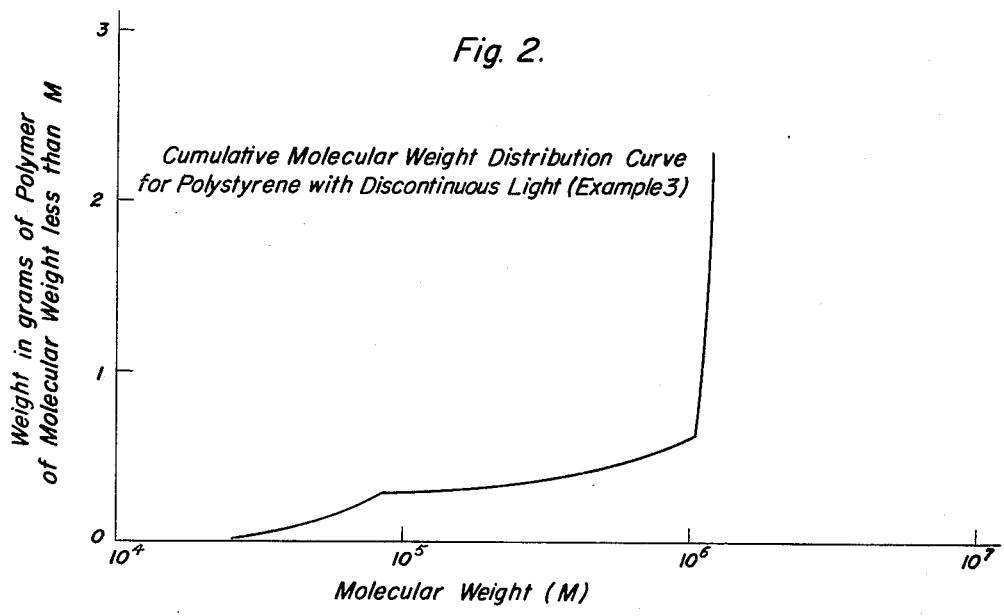

Referring to the drawings, FIGURE 1 is a cumulative molecular weight distribution curve for an olefinic polymer, polystyrene, polymerized with continuous light so as to form a polymer having a broad molecular weight range. FIGURE 2 is a corresponding curve for polystyrene polymerized with discontinuous light so as to form a monodisperse polymer according to this invention. Both figures represent smooth curves formed from plotting the weight in grams of polymer of less than M molecular weight against molecular weight (M) of the fractionated polymer produced during the polymerization.

It is known that olefinic monomers can be polymerized to produce polymers having a wide variety of useful properties. Where olefinic monomers are allowed to polymerize by the usual processes, statistical chance determines the range of molecular weights produced so that the polymer is composed of molecules having a broad molecular weight distribution. Since polymers of all molecular weights are not as easy to process into products having maximum properties, it would be highly desirable to prepare polymers having a desired narrow molecular weight range.

Realizing the advantages of polymers having a narrow molecular weight range, it has been a challenge to chemists to prepare these polymers. One method is disclosed in U.S. Patent 2,666,025, Nozaki, wherein is described the polymerization of vinyl monomers in which the nonterminal or alpha carbon of the vinyl group is free of hydrogens. In the patentee's process these vinyl monomers were exposed to radiation for long periods of time, such as for example many hours, and then allowed to remain in the dark for hours or even days. I have found that when this method is applied to olefinic monomers having $\alpha$-hydrogens on the olefinic group, unsatisfactory results are obtained because polymerization substantially ceases shortly after the light is removed in contrast to the hours and days disclosed by Nozaki. Nozaki (column 2, lines 33–49) also noted a similar result when he attempted to polymerize vinyl polymers having $\alpha$-hydrogens. In a specific example, Example I ($a$, $b$), the patentee noted that with vinyl chloride (a monomer having an $\alpha$-hydrogen) "polymerization was observed during the irradiation period but when the light was removed the polymerization stopped."

In the polymerization of olefinic monomers, four processes are important to polymer growth. They are (1) initiation or creation of a free radical, (2) growth or addition of the monomer to the radical, (3) termination or mutual reaction of two free radicals to produce an inactive polymer and (4) transfer or abstraction by a radical of an atom from some other molecule to produce a polymer molecule and a new radical. In normal polymerization all of these processes are proceeding at once and the molecular weight of the polymer formed is determined statistically by the competition of process (2) with processes (3) and (4) and the resulting molecular weight distribution is quite broad.

I have now discovered that monodisperse polymers can be prepared by a process which controls these four processes. This process is carried out by (1) initiating the polymerization of an emulsified olefinic monomer by a burst of free radicals, (2) allowing the polymerization to continue for a time which is substantially shorter than the natural lifetime of the growing radical chain, (3) again exposing the system to another burst of free radicals, said burst terminating the first polymer chain and initiating a second polymer chain, and (4) repeating these bursts according to a fixed schedule as long as desired or until the monomer is totally polymerized. Since the natural lifetime of a growing radical chain in emulsion polymerization is much longer than in bulk polymerization proceeding at the same overall rate, the emulsion system is used in order to make the natural lifetime as long as possible while still keeping the concentration high enough to produce a practical amount of polymer. In addition, I have found that low temperatures minimize the effect of termination by transfer which has heretofore been a problem with olefinic polymers containing $\alpha$-hydrogens. Where radiation is employed, photosensitizers are highly desirable because they enhance the efficiency of irradiation. Unlike the above-mentioned Nozaki process, my process can be used with olefinic monomers regardless of whether or not they contain $\alpha$-hydrogens.

Unexpectedly, I have also found that $\alpha,\alpha'$-azo-diisobutyramide is far more effective photosensitizer in an emulsion system than $\alpha,\alpha'$-azo-diisobutyronitrile ("Porfor-N"). It is believed that one of the reasons for this effect is the greater water solubility of the amide as compared to the nitrile. This increased water solubility enhances its effect since it is believed that polymerizations in emulsion systems are initiated in micelles present in the water phase so that if the initiator is principally dissolved in large oil drops it is ineffective as an initiator.

In general this invention is carried out by forming an emulsion of the monomer and allowing free radicals to be liberated in the emulsion according to a fixed schedule, said free radicals being caused by (1) radiation or by (2) chemical means, such as occurs in a redox system (i.e. an oxidation-reduction system).

By a "burst of free radicals" described in steps (1), (3) and (4), I mean that enough free radicals are produced by suitable means so that substantially each of the monomer-containing micelles receives at least one free radical. If more than enough free radicals are produced, several radicals may successively enter a micelle during the burst and produce several molecules of very low molecular weight. If some of the growing polymer chains escape termination during a burst, the molecular weight of these chains will escape control so that a fraction of polymer of a higher molecular weight than the desired monodisperse polymer will be produced. In (3) and (4) a sufficient number of free radicals should be produced so that substantially all the growing chains are terminated and a new series initiated. Therefore, there is an optimum burst of free radicals which gives the most nearly monodisperse product. This burst size will vary with each system and can be found by experimentation or by calculations where the necessary rate constants are already known.

Of course, the amount of energy in each burst will vary depending on the number of micelles present in the emulsion and the efficiency of the system in utilizing the incident energy. Since the usual effective emulsion polymerization systems contain about $10^{14}$–$10^{15}$ micelles per ml., one would employ at laest $10^{14}$–$10^{15}$ photons or, in the case of chemical initiation, $10^{14}$–$10^5$ molecules of initiator per burst per ml. assuming total utilization. In (3) and (4) at laest twice this number of free radicals should be produced since one must be used to terminate the growing chain and a second to initiate another chain. However, depending on the efficiency of the system, larger amounts of energy or initiator might have to be used. Where the number of micelles are greater or lesser, one would make appropriate adjustments based on experimentation or calculations.

The polymerization described in (2) should be substantially shorter than the natural lifetime of the growing polymer chain. By "natural lifetime" is meant the average time a radical grows before suffering a transfer reaction. Since the natural lifetime of the growing polymer chain is an average value, the lifetime of individual growing polymer chains covers a range of times from much less than a second to times of the order of hours. The time of polymerization (2) should be short enough so that a minimum fraction of growing polymer chains terminate naturally before the end of (2). Hence, the time of polymerization in (2) should be substantially shorter than the average time of the natural life. In the case of styrene, the natural lifetime will vary with temperature, but at 0° C. it has been reported to be about 25 minutes. Since this value is an average value, which contains within the average, chains which are terminated within shorter and longer times, and since it is desirable to terminate growth in a short enough time so that only a minimum fraction of chains will have terminated naturally, it is highly desirable to have the growth period substantially less than 25 minutes. Thus, I prefer to have this growth period at about 1–3 minutes. Of course, if one desires higher molecular weights one may allow the chain to grow for a longer period of time.

Any type of radiation capable of forming free radicals can be employed, which includes electromagnetic radiation such as gamma radiation (1.4–0.005 A.U.), X-ray (10–200 A.U.), ultraviolet (500–4000 A.U.), visible light (4000–7500 A.U.) and corpuscular radiation such as electrons, and the like. In most applications I may advantageously use ultraviolet radiation although radiations of 2500–5000 A.U. are preferred. The intensity of the radiation required will of course depend upon the particular type of monomer and co-monomers polymerized. The schedule of exposure and nonexposure to light will depend on the desired molecular weight and the natural lifetime of the growing radical chain.

The reaction is carried out using emulsion polymerization at as low a temperature as is consistent with a reasonable rate of polymer growth. Emulsion polymerization is employed since the natural lifetime of a growing radical chain in emulsion polymerization is much longer than in bulk polymerization proceeding at the same overall rate. In addition, the emulsion system is used to make the natural life as long as possible and still keep the concentration high enough to produce a practical amount of polymer. Mutual termination between two growing chains can be practically eliminated by using an emulsion system since it is known that each growing chain is its own micelle with the result that termination can only occur when a large number of radicals are present in the water phase such as occurs during the controlled burst of radiation. In order to minimize the effect of termination by transfer, the emulsion polymerization is carried out at as low a temperature as possible preferably just above the freezing point of the emulsion, which may be adjusted, if necessary, by use of an anti-freeze such as ethylene glycol. Emulsion polymerizations of various olefinic monomers is discussed in Schildknecht, Vinyl and Related Polymers, pages 16, 86–118, 223–226, 333, 395. The methods disclosed therein for effecting emulsion may be employed in the present invention.

A wide variety of emulsifying agents can be used and the amount of said agent can be varied over a wide range depending on the monomer being polymerized. In general, the amount can vary from 0.1% to 5%, or higher by weight of monomer, but preferably between 0.1% to 1%. Among the emulsifying agents that can be employed are alkali metal soaps (i.e. sodium and potassium myristates, laurates, palmitates, oleates, stearates, rosinates, hydroabiates, and the like); the alkali metal alkyl or alkylene sulfates (i.e. sodium lauryl sulfate, potassium stearyl sulfate, etc.); the alkali metal alkyl and alkylene sulfonates (i.e. sodium lauryl sulfonate, sodium stearyl sulfonate, potassium cetyl sulfonate, sulfonated mineral oils, etc.); amine and ammonium salts thereof; salts of long chain amines (i.e. lauryl amine hydrochloride, stearyl amine hydrobromide, and the like).

Photosensitizers may be advantageously added to the emulsion polymerizations in varying amounts depending on the particular photosensitizer and monomer used. Among these photosensitizers can be mentioned lead tetraethyl, diacetyl, phenylglyoxal, glyoxal, acetone, vat dyes, azo compounds such as $\alpha,\alpha'$-azo-diisobutyronitrile, etc. I prefer to use a water soluble photosensitizer since most of the polymerization occurs in the aqueous phase. I have found $\alpha,\alpha'$-azo-diisobutyramide to be superior to the corresponding nitrile because it is, among other things, more water soluble. In the case of the amide I can use from about 0.05 to 10.0% by weight of monomer, but preferably from about 0.5% to 2.0%.

In addition to radiation, other means can be used for creating a schedule of bursts of free-radicals according to this invention. These bursts of free radicals can also be caused by chemical means such as affected in a redox system capable of forming free radicals. Thus, an emulsion can be prepared according to the methods herein disclosed except that the emulsion contains an excess of an easily oxidizable ion. Thereupon, according to a fixed schedule an oxidizing material is added to the reaction mixture. Upon each addition the oxidizing material reacts with the easily oxidizable ion to produce free radicals and the oxidizing material is itself destroyed in a few seconds. In this manner a monodisperse polymer is produced.

Among the redox systems which supply the easily oxidizable ion and the oxidizing material are metal ions-persulfate systems such as ferrous-persulfate, cuprous-persulfate, titanous III-persulfate, stannous-persulfate, and the like which as a class are preferred because of their fast reactions. Other redox systems are described in High Polymers, vol. IV, pp. 71–94, Interscience Publishers (1955).

At the completion of the reaction the polymer is removed from the reaction mixture by any suitable means such as filtration, coagulation, extraction, etc.

To illustrate the manner in which the invention may be carried out the following examples are given. It is to be understood, however, that the examples are for the purpose of illustration and are not to be regarded as limiting the invention in any way.

The polymers produced in the following examples were removed from the reaction mixture by coagulation with alcohol and fractionated. The molecular weight of each fraction was determined from viscosities.

The polymer was fractionated by dissolving them in butanone, at a concentration of approximately one percent, and successive fractions precipitated by adding small increments of alcohol with rapid stirring. After each increment of alcohol was added, the mixture was stirred for a few minutes and then allowed to stand quietly for several hours to allow the precipitate to settle. The precipitate so obtained constituted one of the fractions referred to in the examples.

The relative viscosity of the polymer solutions in benzene with respect to the solvent was measured at several concentrations in the range between 0.1% to 1.0% in viscometers of the Ubbelohde type. The intrinsic viscosity, $[\eta]$, was obtained by plotting either $$\frac{\eta \text{ rel} - 1}{C}$$

or $$\frac{\log_e \eta \text{ rel}}{C}$$

against $C$, where $\eta$ rel is the viscosity of the solution relative to that of the solvent as unity and $C$ is the concentration of the solution in grams per milliliter. The intrinsic viscosity, $[\eta]$ is the intercept of either (or both) of these plots at $C=0$.

The relation between $[\eta]$ and molecular weight is given authoritatively by R. H. Boundy and R. F. Boyer in "Styrene," published by Reinhold Publishing Co., New York, 1952, page 335. A graph is given therein where $[\eta]$ in benzene is plotted on a logarithmic scale against molecular weight on a logarithmic scale. Molecular weights were determined from this graph.

EXAMPLE 1

Five grams of α,α'-azo-diisobutyronitrile was dissolved in 22 ml. of concentrated sulfuric acid. Fifteen hours later the mixture was poured in 100 g. of ice and 100 grams of potassium carbonate in a beaker cooled with cracked ice. The acid was very slowly added to the carbonate-ice mixture with vigorous stirring. Water decanted from the solid $K_2SO_4$ was extracted with chloroform. The solids were washed several times with acetone. The chloroform and acetone were evaporated at reduced pressure at room temperature to yield about 4 g. of product.

The product, α,α'-di-azo-diisobutyramide, was much more soluble in water than the original nitrile. This compound on exposure to an ultraviolet lamp evolved nitrogen indicating the azo group was still intact.

EXAMPLE 2

An emulsion was prepared from 50 cc. of distilled styrene, 250 cc. of water, and 2.5 grams of sodium lauryl sulfate and 0.5 gram of the amide prepared in Example 1, and air was removed from the emulsion by blowing nitrogen through for about 30 minutes. The emulsion was continuously stirred by means of a magnetic stirrer in a completely filled flask open to the interior only through a very long narrow capillary tube, thus minimizing exposure to air. The temperature was maintained at about 0° C. by using a stirred ice-water bath. This emulsion was continuously subjected to ultraviolet light for 1 hour to yield 0.917 gram of polymer, part of which was fractionated into its molecular weight components by precipitation. The molecular weights of each component were determined from viscosity measurements. The results are shown in Table I and in FIGURE 1.

*Table I*

RESULTS OF THE FRACTIONATION OF POLYMER MADE IN CONTINUOUS LIGHT

| Fraction | $[\eta]$ | Mol. Wt. | Wt. in Fraction, g. |
|---|---|---|---|
| 1 | 67 | $1.48 \times 10^5$ | 0.177 |
| 2 | 57 | $1.18 \times 10^5$ | 0.069 |
| 3 | 40 | $7.40 \times 10^4$ | 0.122 |
| 4 | 31 | $5.30 \times 10^4$ | 0.211 |
| 5 | 23 | $3.30 \times 10^4$ | 0.067 |
| 6 | 21 | $3.10 \times 10^4$ | 0.158 |

EXAMPLE 3

An emulsion of 25 cc. of distilled styrene, 125 cc. of water, 5.0 grams of sodium lauryl sulfate, and 0.25 gram of the amide of Example 1 was prepared and deoxygenated in the manner of Example 2.

Stirring and cooling was accomplished in the same manner. In place of the continuous exposure to ultraviolet light as done in Example 2, the polymerization was carried on for one hour according to the following discontinuous radiation schedule by repeating without interruption: Light on for 30 seconds, off for 90 seconds. The 3.2 grams of polymer produced by the method, of which a portion was fractionated into its molecular weight components by precipitation. The molecular weights of each components was determined from viscosity measurements. The results are shown in Table II and in FIGURE 2.

*Table II*

RESULTS OF THE FRACTIONATION OF "MONODISPERSE" POLYMER

| Fraction | $[\eta]$ | Mol. Wt. | Wt. in Fraction, g. |
|---|---|---|---|
| 1 | 285 | $9.7 \times 10^5$ | 0.161 |
| 2 | 350 | $1.3 \times 10^6$ | 0.180 |
| 3 | 375 | $1.35 \times 10^6$ | 0.359 |
| 4 | 360 | $1.30 \times 10^6$ | 0.371 |
| 5 | 375 | $1.35 \times 10^6$ | 0.292 |
| 6 | 360 | $1.30 \times 10^6$ | 0.155 |
| 7 | 290 | $1.00 \times 10^6$ | 0.298 |
| 8 | 50 | $1.00 \times 10^5$ | 0.387 |
| 9 | 35 | $6.25 \times 10^4$ | 0.114 |

EXAMPLE 5

When the composition of Example 2 was polymerized by the methods described in the above-mentioned Nozaki patent, polymerization continued when exposed to light and the rate of polymerization dropped off so rapidly in the dark that it was impossible to continue the complete polymerization without light, as Nozaki's method requires.

The following examples are presented as a means of preparing monodisperse polymers, by a free radical schedule carried out by chemical means.

EXAMPLE 5

An emulsion was prepared in the manner of Example 3 except that the emulsion contained ferrous ions derived from 0.39 gram of ferrous ammonium sulfate and 1 ml. of a 25% solution of "Versene" (ethylenediaminetetracetic acid) and none of the amide of Example 1. Thereupon 0.1 ml. of 0.1 molar potassium persulfate was added according to a fixed schedule every 5 minutes for 80 minutes. By this method 3.3 grams of monodispersed polymer was produced.

EXAMPLE 6

An emulsion was prepared from 30 ml. of styrene, 110 ml. of water, 1 gram of sodium lauryl sulfate, 10 ml. of a 0.5 molar solution of sodium thiosulfate, 5 ml. of a 0.5 molar solution of cupric sulfate, and 1 ml. of concentrated ammonium hydroxide. Thereupon, 0.1 ml. of 0.1 molar potassium persulfate was added every two minutes for 30 minutes to produce a monodisperse polymer.

It is to be noted that despite the fact that half as much monomeric styrene was used as a starting material in Example 3 as in Example 2, more than 3.5 times as much polymer was formed. Of course, the reaction in each example can be carried to substantial completion so that all of the polymer would be converted to polystyrene, but the rate of polymerization would be 3.5 times as fast in Example 3. When the reaction was carried out according to the method described in the above-mentioned Nozaki patent (Example 4) polymerization substantially ceased shortly after the light source was removed.

In addition to the faster rate the product obtained in Example 3 had a much narrower molecular weight range than the product obtained in Example 2. Even though more than twice as much monomer was used in Example 2 than in Example 3, I have succeeded in producing by my process more monodisperse polymer of a very narrow molecular weight range than was produced for all molecular weights in Example 2. This difference is clearly brought out by comparing the graphs of FIG. 1 (Example 2) and FIG. 2 (Example 3). Whereas the molecular weights of Example 2 are spread out evenly over a decade, the molecular weights of more than half of the polymer of FIG. 2 is concentrated within 0.05 of a decade.

Although the molecular weights of the monodispersed polymer produced in the specific example was from 1.0 to $1.3 \times 10^6$, the desired narrow molecular weight range can be varied by changing the radiation schedule.

In addition to the monomer described in the above examples other monomers which can be polymerized according to this invention include the free radical polymerizable olefinic monomers which can be homopolymerized. These compounds contain at least one

group where the R's (which may or may not be different) are selected from the group consisting of hydrogen, halogens and organic radicals. Among these radicals are hydrocarbons, halohydrocarbons, esters, nitriles, amides ketones, ethers, etc. Examples of these unsaturated compounds are ethylene, haloethylenes such as chlorotrifluoroethylene, tetrafluoroethylene, etc., propylene, butylene, and other unsaturated members of the alkylene series, conjugated unsaturated compounds such as isoprene, butadiene, chlorobutadiene, dimethylbutadiene, and the like; esters such as methallyl acetate, methallyl benzoate, chloroallyl caproate, dimethylallyl phthalate, ethyl acrylate, methyl acrylate, ethyl bromoacrylate, cyanoallyl acetate, etc; nitriles such as acrylonitrile, haloacrylonitrile, methallyl benzonitrile, halobutenenitrile, ethallyl naphthonitrile, ethyl vinylcyclohexanenitrile, and the like; amides such as acrylamide, pentenamides, halopentenamides, ethallyl naphthamide, etc.; ketones such as vinyl ketone, allyl ketone, aromatic vinyl ketones, etc., ethers such as vinyl ethers, allyl ethers, alkyl vinyl ethers and the like; acetals such as vinyl acetals, etc.; aromatic compounds such as styrene, alkoxy styrene, halostyrenes, alkyl styrene, vinyl naphthalene, etc.; vinyl halides such as vinyl bromide, vinyl chloride, vinyl fluoride, allyl chloride, vinylidene halides such as vinylidene chloride, vinylidene bromide, etc. The unsaturated groups contained therein may be terminal, $CH_2=C<$ or nonterminal, $>C=C<$. In addition even where the unsaturated compound is not capable of being homopolymerized, it may be employed with other monomers in various proportions to produce copolymers. These copolymers may be random polymers, —ABAABBAB— block polymers

—AAAABBBBAAAA— or graft polymers

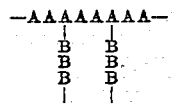

etc.

The products of this invention can be fabricated, molded, extruded or calendered to produce a wide variety of articles of manufacture such as for example, films, containers, insulating materials, industrial parts such as machine parts, laminates, surface coatings, etc. These monodisperse polymers are particularly useful in injection molding since the melt viscosity of the polymer is very dependent on molecular weight. Thus, by controlling molecular weight one can control the workability and final characteristics of the finished polymer.

What I claim as new and desire to secure by Letters Patent of the United States is:

1. The method of preparing polymers having a narrow molecular weight range from olefinic monomers which comprises (1) preparing an aqueous emulsion of the monomer, (2) exposing the emulsion to ultraviolet light having a wavelength in the range of 2500–5000 Angstrom units to initiate the formation of growing polymer chains by rapidly producing free radicals in the monomer-containing micelles, (3) terminating the exposure to ultraviolet light, thereby interrupting the generation of the free radicals, for a time determined to produce a polymer of the desired molecular weight, (4) initiating the generation of free radicals in the micelles of the emulsion by the same means as in (2) in sufficient quantity to (a) react with and terminate the growth of substantially all of the polymer chains at the desired molecular weight and (b) initiate growth of new polymer chains in the monomer-containing micelles, and (5) repeating steps (3) and (4) in consecutive order until the desired amount of monomer is converted to polymer.

2. The method of claim 1 wherein a photosensitizer is used.

3. The method of claim 1 wherein the photosensitizer is α,α'-azo-diisobutyramide.

4. The method of preparing polystyrene having a narrow molecular weight range from styrene which comprises (1) preparing an aqueous emulsion of styrene, (2) exposing the emulsion to ultraviolet light having a wavelength in the range of 2500–5000 Angstrom units to initiate the formation of growing polymer chains by rapidly producing free radicals in the styrene-containing micelles, (3) terminating the exposure to ultraviolet light, thereby interrupting the generation of the free radicals for a time determined to produce polystyrene of the desired molecular weight, (4) initiating the generation of free radicals in the micelles of the reaction medium by the same means as in (2) in sufficient quantity to (a) react with and terminate the growth of substantially all of the polymer chains at the desired molecular weight, and (b) initiate growth of new polymer chains in the styrene-containing micelles, and (5) repeating steps (3) and (4) in consecutive order until the desired amount of monomer is converted to polymer.

5. The method of preparing polystyrene having a narrow molecular weight range which comprises (1) preparing an aqueous emulsion of the styrene, (2) exposing the emulsion to ultraviolet light having a wavelength in the range of 2500–5000 Angstrom units to initiate the formation of growing polymer chains by rapidly producing free radicals in the styrene-containing micelles, (3) terminating the exposure to ultraviolet light, thereby interrupting the generation of the free radicals, for a period of 1 to 3 minutes to produce a polymer of the desired molecular weight, (4) initiating the generation of free radicals in the micelles of the reaction medium by the same means as in (2) in sufficient quantity to (a) react with and terminate the growth of substantially all of the polymer chains at the desired molecular weight, and (b) initiate growth of new polymer chains in the styrene-containing micelles, and (5) repeating steps (3) and (4) in consecutive order until the desired amount of monomer is converted to polymer.

References Cited in the file of this patent

UNITED STATES PATENTS

| | | |
|---|---|---|
| 2,565,573 | Pease et al. | Aug. 28, 1951 |
| 2,666,025 | Nozaki | Jan. 12, 1954 |
| 2,762,769 | Smith | Sept. 11, 1956 |

FOREIGN PATENTS

| | | |
|---|---|---|
| 665,262 | Great Britain | Jan. 23, 1952 |